(12) United States Patent
Snop

(10) Patent No.: US 6,761,548 B1
(45) Date of Patent: Jul. 13, 2004

(54) ISOTAT FOR THE TREATMENT OF MATERIALS IN LIQUID

(75) Inventor: Vladimir Isakovich Snop, Moscow (RU)

(73) Assignee: Autoclave, High Pressure & Temperature Limited, Tortola (VG)

( * ) Notice: Subject to any disclaimer, the term of this patent is extended or adjusted under 35 U.S.C. 154(b) by 0 days.

(21) Appl. No.: 10/129,604

(22) PCT Filed: Apr. 25, 2000

(86) PCT No.: PCT/RU00/00148

§ 371 (c)(1),
(2), (4) Date: May 8, 2002

(87) PCT Pub. No.: WO01/34329

PCT Pub. Date: May 17, 2001

(30) Foreign Application Priority Data

Nov. 10, 1999 (RU) ............................................ 99123273

(51) Int. Cl.[7] ........................... B29C 33/04; B29C 43/10
(52) U.S. Cl. ...................... 425/3; 425/174.8 R; 425/86; 425/405.2; 264/570
(58) Field of Search ............................. 425/3, DIG. 33, 425/78, 84, 85, 86, 405.1, 405.2, 174.8 R; 264/570

(56) References Cited

U.S. PATENT DOCUMENTS 3,085,291 A * 4/1963 Eduard et al. ................. 425/3
3,958,908 A * 5/1976 Schubart ....................... 425/84
5,057,171 A * 10/1991 Horner et al. ............ 425/405.2
6,685,870 B2 * 2/2004 Ukechi et al. ........... 425/405.2

FOREIGN PATENT DOCUMENTS

| DE | 2006066 | 2/1971 |
| DE | 2659413 | 7/1978 |
| GB | 2048952 | 12/1980 |
| RU | 659285 | 4/1979 |
| RU | 948538 | 6/1985 |

OTHER PUBLICATIONS

Vneshtorgizdat (1990) Vnimetmash "Machines for Powder Metallurgy", Edition No. 763MB, p. 5. (to follow).
ASEA (1990) Sweden, A08–4007E, p. 3.

* cited by examiner

Primary Examiner—Robert Davis
Assistant Examiner—Thu Khanh T. Nguyen
(74) Attorney, Agent, or Firm—Collard & Roe, P.C.

(57) ABSTRACT

The invention relates to the equipment for high-pressure, high-temperature treatment of materials in liquid and enables to broaden the technological capabilities of an isostatic press. The isostatic press for treatment of materials in liquid comprises a multi-cylinder pressure vessel forming a hermetically sealed working chamber connected to a gas source. The open-top container for liquid is placed in the working chamber in such a way that a gap is created between the inner wall of the pressure vessel and the outer wall of the container. The container with the liquid and the treated material is placed on an electrically insulated heater which, in its turn, is mounted on a protective magnetic block.

9 Claims, 2 Drawing Sheets

ISOTAT FOR THE TREATMENT OF MATERIALS IN LIQUID

CROSS REFERENCE TO RELATED APPLICATIONS

Applicant claims priority under 35 U.S.C. §119 of Russian Application No. 99123273 filed Nov. 10, 1999. Applicant also claims priority under 35 U.S.C. §120 of PCT/RU00/00148 filed Apr. 25, 2000. The international application under PCT article 21(2) was not published in English.

FIELD OF THE INVENTION

Invention relates to the equipment for treatment of materials in a liquid under high pressures and temperatures and can be used most efficiently in curing, polymerization, densification and chemical treatment of discrete and continuous materials under pressures above. The 10 MPa and temperatures above 100° C.

BACKGROUND OF THE INVENTION

Isostatic pressing technology is considered as one of the "high technologies" and is rapid developing in the world.

There is a known isostatic press (see the prospectus of VNIIMETMASH "Machines for Powder Metallurgy", published in Moscow by Vneshtorgizdat, 1990, edition No. 763MB, p.5) that includes a pressure vessel with a working chamber.

The working chamber is hermetically sealed by the top and bottom closures that form a closed hermetic work volume in which the treated product is placed.

The treatment of the product is achieved by feeding the working liquid under the required pressure into the vessel.

The shortcoming of this isostatic press is that the process takes place at the ambient temperature since, owing to its design's peculiarity, it cannot be equipped with a heater. The cause of it is that the vessel is filled with a liquid. This reduces the technological capabilities of such press.

Moreover, the working liquid itself, by acting on the treated product, gets into direct contact with the inner walls of the pressure vessel and causes their corrosion. All this has a negative effect both on the quality of the treated product and on the durability of pressure vessel due to the aggressive influence of the applied liquid on the inner surface of the pressure vessel. In some cases such influence leads to leakage and, furthermore, to the liquid's breaking through into the working medium and its contamination.

The closest to the claimed invention is the cold isostatic press for treatment of materials in liquid (see the prospectus of ASEA, Sweden, A08-4007E, 1990, p. 3) which comprises a multi-cylinder pressure vessel with coaxial tightly fitted one-piece metal cylinders, whereof the outer cylinder has a tightly wound flat steel wire on its surface and the inner cylinder forms a working chamber which is hermetically closed by the top and bottom closures with seals and connected to a liquid source that creates a pressure in the vessel. The working liquid is fed under pressure directly into the vessel where the treated product is placed.

This prototype cold isostatic press has the same shortcomings as the one described before. Moreover, the liquid leakage from the vessel causes a rapid pressure drop in it (due to small compressibility of the liquid) which leads to disruption of the normal technological process.

SUMMARY OF THE INVENTION

The claimed invention is aimed at expanding the technological capabilities of isostatic pressing in isostatic presses.

The technical result of the claimed invention consists in making use of the advantages of a gas as a pressure-creating medium while subjecting the product to the action by a liquid. Both gas (mainly inert gas) and specially chosen liquids are used as working medium. Thereby the treating (forming) effect on the product is achieved by the liquid and the pressure is conveyed to the liquid through the gas medium. Owing to high compressibility of the gas medium, the pressure in the vessel is falling not so intensively during gas leakage than when a liquid is used as a pressure medium. Overall power consumption is lowered, the environmental effect is improved, the materials consumption and the dimensions of the apparatus in general are reduced.

The technical result is achieved as the isostatic press for treatment of materials in a liquid, comprising a pressure vessel which forms a hermetically sealed working chamber connected to the pressure source wherein an open-top container for liquid is placed in such a way that a gap between the inner wall of the pressure vessel and the outer wall of the container for liquid is created, whereby the container for liquid has a hermetically sealed bottom made of a current-conducting material and is placed on an electrically insulated inductive heater mounted on the protective magnetic block, while the pressure source is a gas source.

Thereby the pressure vessel is preferably made as a multi-cylinder unit with coaxial tight-fitting one-piece metal cylinders, whereof the outer cylinder is made with a tightly wound prestressing flat steel wire and the working chamber is hermetically sealed by the top and bottom closures with seals.

Thereby the protective magnetic block is located on the upper butt of the bottom closure.

Thereby the apertures for inlet-outlet of cooling water can be made on the surface of one of the one-piece metal cylinders forming the pressure vessel while a ring groove for condensate collection can be made on the butt of the bottom closure.

The electrically insulated heater can be either in the form of a flat inductor consisting of one-piece units of current-conducting (e.g. copper) plates, or in the form of a single-piece spiral-like copper plate. The protective magnetic block can be made of radial and non-contiguous units of electrical steel sheet.

Due to high compressibility of the gas medium, the pressure in the vessel during gas leakage (which is more or less inevitable) is falling not so intensively as in the case when a liquid medium is used as pressure source, thus enabling to reduce the energy cost for maintaining the normal technological process. Thereby any leakage of working liquid is excluded, what will have a beneficial ecological effect on the environment. Both the materials consumption and the dimensions of the apparatus are generally reduced.

The presence of a gas-containing volume allows to place in the vessel a heater that transfers the heat directly to the working liquid in the container, and to treat the product at high temperatures. The protective magnetic block prevents the bottom of the working chamber from induction heating thus allowing to reduce the convection in the gas volume and to lower the heat loss caused by the convection.

LIST OF DRAWINGS

The claimed isostatic press for treatment of materials in liquid is shown in the drawings.

PREFERRED IMPLEMENTATION OF THE INVENTION

Figure 1:
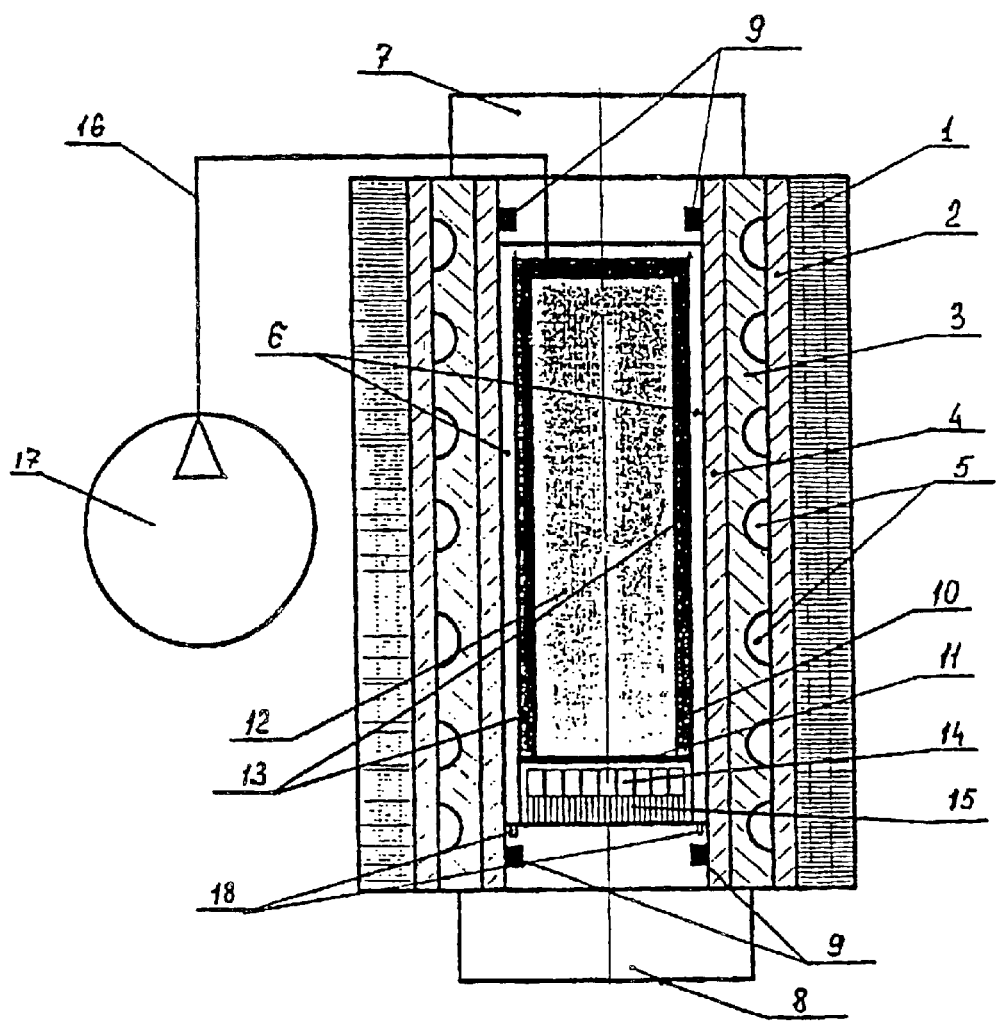
FIG. 1 shows the longitudinal section of the isostatic press in working condition, with the feed from a high-pressure gas source (compressor).
Figure 2:
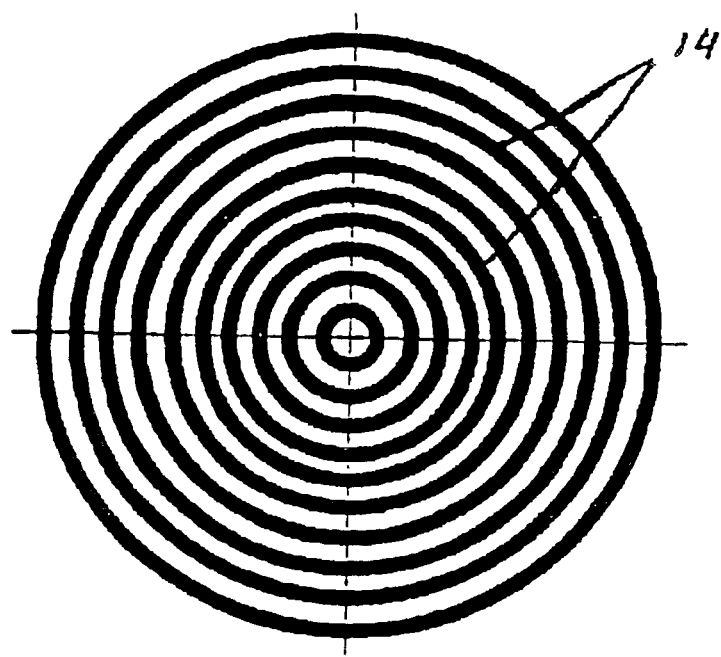
FIG. 2 shows the enlarged heater (top view).

The isostatic press for treatment of materials in liquid comprises the multi-cylinder pressure vessel (FIG. 1) made of coaxial cylinders whereof the outer cylinder 1 is a flat steel wire tightly wound on the surface of the adjoining cylinder 2. The cylinders 2,3, and 4 of the pressure vessel are made in the form of one-piece metal cylinders. In the middle cylinder 3, the channels 5 for inlet-outlet of cooling water are made. The inner cylinder 4 forms the working chamber 6 of the pressure vessel which is hermetically sealed by the top closure 7 and the bottom closure 8. The closures 7 and 8 are provided with the seals 9. In the working chamber 6 there is the container for liquid 10 with the open top and the hermetically sealed bottom 11 made of current-conducting material. In the container 10 the treated material 12 is placed, immersed in the working liquid 13. The hermetically sealed bottom 11 of the container 10 rests on the electrically insulated heater 14 which, in its turn, rests on the protective magnetic block 15, which is based on the upper butt of the bottom closure 8.

Between the outer surface of the container 10 and the inner surface of the central cylinder 4, owing to their coaxial positioning, a gap is created which serves as a heat-insulating envelope after the working chamber 6 is filled with gas, thus preventing heat transfer from the walls of the container 10 to the walls of the cylinder 4 of the pressure vessel. The gas enters the working chamber 6 of the pressure vessel through the pipeline 16 issuing from the compressor 17. In the butt of the bottom closure 8, encircling it, a ring groove 18 is made for the condensate collection.

Figure 3:
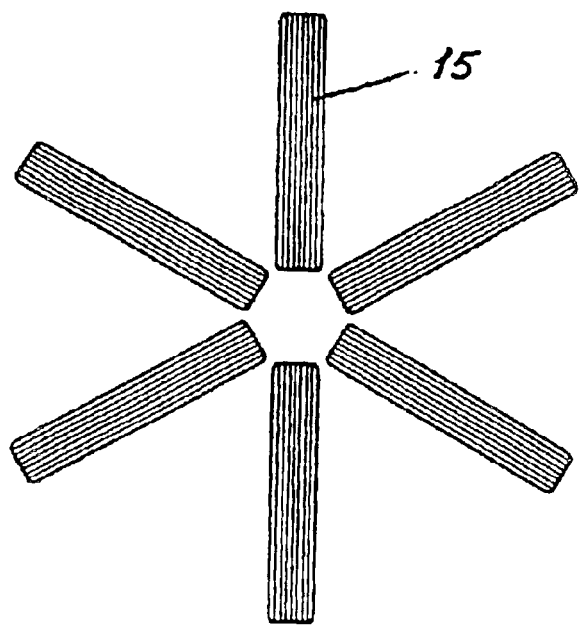
FIG. 3 shows the enlarged protective magnetic block (top view).

The electrically insulated heater 14 can be made in the form of a flat inductor consisting of units of one-piece current-conducting (e.g. copper) plates or in the form of a single-piece spiral-like copper plate. The protective magnetic block 15 (FIG. 3) is made of radial and non-contiguous units of electrical steel sheets.

The isostatic press for treatment of materials in liquid works as follows:

The protective magnetic block 15, the electrically insulated heater 14 and the container 10 with the prepared piece of material for treatment 12 immersed in the working liquid 13, are all placed in succession on the butt of bottom closure 8 on a special device (not shown in the drawings). The working fluid 13 is chosen according to the task to be performed. This whole system is placed in the working chamber 6 of the pressure vessel on the bottom closure 8, and the working chamber is hermetically sealed with the help of the top closure 7 and the bottom closure 8. The working chamber 6 is filled with a gas (or a gas mixture) using the compressor 17. Then the electrically insulated heater 14 is switched on and the bottom of container 10 is heated ensuring the heat transfer to the treated material and the working liquid 13. For commercial operation, the pressure of the gas (or gas mixture) is usually chosen to be equal to, or more than, 10 MPa while a particular gas pressure value is set on the basis of specifications of the chosen liquid 13 for a particular task to be performed, and the following necessary condition should be met: the gas pressure should be absolutely higher than the critical point pressure of the liquid chosen for the process. E.g. for water, the critical point parameters are: pressure 22.1 MPa, temperature 647 K (374° C.).

Under the applied pressure in the container 10 with the liquid 13, one of the chosen treatment processes is taking place: densification of discrete or continuous materials, curing, chemical treatment etc.

After the process has been completed, the gas pressure is brought down, the processed material is taken out of the container 10 and the process is repeated.

INDUSTRIAL APPLICABILITY

The proposed isostatic press has a broad range of technological capabilities, in combination with ecological cleanness, low energy and material consumption and small overall size, and it could find application in various industries such as powder metallurgy, polymer and rubber production etc.

What is claimed is:

1. An isostatic press for treatment of materials in a liquid, comprising a pressure vessel, forming a hermetically sealed working chamber connected to the pressure source, wherein an open-top container for liquid is placed in such a way that a gap is created between the inner wall of the pressure vessel and the outer wall of the container for liquid, whereby the container for liquid has a hermetically sealed bottom made of current-conducting material and is placed on an electrically insulated inductive heater mounted on a protective magnetic block, while the pressure source is a gas source.

2. The isostatic press of claim 1, wherein the pressure vessel is made as a multi-cylinder unit, with coaxial tight-fitting one-piece metal cylinders whereof the outside cylinder is made of tightly wound prestressing flat steel wire.

3. The isostatic press of clam 1, wherein the working chamber is hermetically sealed by the top and bottom closures with seals.

4. The isostatic press of claim 3, wherein the protective magnetic block is located on the top bull bottom closure.

5. The isostatic press of claim 2, wherein the apertures for inlet-outlet of cooling water are made on the surface of one of the one-piece metal cylinders forming the pressure vessel.

6. The isostatic press of claim 3, wherein a ring groove for collection of the condensate is made on the butt of the bottom closure.

7. The isostatic press of claim 1, wherein the inductive heater is made in the form of a flat inductor consisting of units of one-piece current-conducting (e.g. copper) plates.

8. The isostatic press of claim 1, wherein the heater is made of a single-piece copper plate in the form of a spiral.

9. The isostatic press of claim 1, wherein the protective magnetic block is made of radial and non-contiguous units of electrical steel sheets.

* * * * *